(12) United States Patent
Yamaki et al.

(10) Patent No.: US 8,162,385 B2
(45) Date of Patent: Apr. 24, 2012

(54) LOAD TRANSMISSION BODY FOR VEHICLE

(75) Inventors: Jogen Yamaki, Utsunomiya (JP); Takeshi Abe, Utsunomiya (JP); Hisato Oku, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/945,132

(22) Filed: Nov. 12, 2010

(65) Prior Publication Data

US 2011/0057477 A1 Mar. 10, 2011

Related U.S. Application Data

(63) Continuation of application No. 12/459,922, filed on Jul. 9, 2009, now Pat. No. 7,854,470.

(30) Foreign Application Priority Data

Jul. 11, 2008 (JP) .................................. 2008-181438

(51) Int. Cl.
*B60J 7/00* (2006.01)
(52) U.S. Cl. ................................. 296/187.12
(58) Field of Classification Search ............. 296/187.12, 296/204, 146.6, 146.5, 187.03, 203.03, 146.9, 296/209

See application file for complete search history.

(56) References Cited

U.S. PATENT DOCUMENTS

| | | | |
|---|---|---|---|
| 4,231,607 A * | 11/1980 | Bohlin | 296/63 |
| 5,000,509 A * | 3/1991 | Sinnhuber et al. | 296/187.12 |
| 5,085,481 A * | 2/1992 | Fluharty et al. | 296/37.8 |
| 5,407,244 A * | 4/1995 | Nakano et al. | 296/68.1 |
| 5,468,045 A * | 11/1995 | Weber | 297/216.11 |
| 5,507,554 A * | 4/1996 | Nakano et al. | 297/216.13 |
| 5,671,968 A * | 9/1997 | Masuda et al. | 296/187.12 |
| 5,897,155 A * | 4/1999 | Kerner et al. | 296/37.8 |
| 6,116,674 A * | 9/2000 | Allison et al. | 296/37.8 |
| 6,237,991 B1 * | 5/2001 | Weber | 296/187.12 |
| 6,299,239 B1 * | 10/2001 | Sagawa et al. | 296/187.12 |
| 6,547,326 B1 * | 4/2003 | Walkinshaw et al. | 297/188.01 |
| 6,604,781 B2 * | 8/2003 | Uchida | 296/204 |
| 6,761,388 B2 * | 7/2004 | Lein et al. | 296/24.34 |
| 7,104,592 B2 * | 9/2006 | Song | 296/187.12 |
| 7,111,899 B2 * | 9/2006 | Gray | 296/187.02 |

(Continued)

FOREIGN PATENT DOCUMENTS

JP S54-034914 U 3/1979

(Continued)

*Primary Examiner* — Kiran B Patel
(74) *Attorney, Agent, or Firm* — Carrier Blackman & Associates, P.C.; Joseph P. Carrier; William D. Blackman

(57) ABSTRACT

A load transmission body for a vehicle, which transmits an impact load to a floor of the vehicle body, includes: a pair of side walls fixed to the floor of the vehicle body and extending in a vehicle front-back direction; a front reinforcing wall having a closed cross-sectional structure, extending in a vehicle width direction, and reciprocally coupling with the pair of side walls; a rear reinforcing wall disposed at a vehicle rear side of the front reinforcing wall, having a closed cross-sectional structure, extending in the vehicle width direction, and reciprocally coupling with the pair of side walls; and a side reinforcing member provided at each of the side walls, having reinforcing beads extending in the vehicle front-back direction, and a front end portion and a rear end portion that are coupled to the front wall and the rear wall, respectively.

2 Claims, 7 Drawing Sheets

U.S. PATENT DOCUMENTS

| | | | |
|---|---|---|---|
| 7,328,938 B2 * | 2/2008 | Matsuda | 296/187.12 |
| 7,396,062 B2 * | 7/2008 | Hung et al. | 296/24.34 |
| 7,645,187 B2 | 1/2010 | Niwa | |
| 2009/0021061 A1 * | 1/2009 | Yamaki et al. | 297/216.13 |

FOREIGN PATENT DOCUMENTS

| | | |
|---|---|---|
| JP | 62-210151 A | 9/1987 |
| JP | 07-023643 U | 5/1995 |
| JP | 2001-151022 A | 6/2001 |
| JP | 2005-335523 A | 12/2005 |
| JP | 2007-290579 A | 11/2007 |
| JP | 2009-006894 A | 1/2009 |
| JP | 2009-241710 A | 10/2009 |
| WO | 2009/007935 A2 | 1/2009 |

* cited by examiner

LOAD TRANSMISSION BODY FOR VEHICLE

CROSS-REFERENCE TO RELATED APPLICATIONS

The present application is a continuation application of U.S. patent application Ser. No. 12/459,922, filed 9 Jul. 2009, which claims priority under 35 USC 119 based on Japanese patent application No. 2008-181438 filed on 11 Jul. 2008. The entire subject matter of these priority documents is incorporated by reference herein.

BACKGROUND OF THE INVENTION

1. Field of the Invention

The present invention relates to a load transmission body for a vehicle that transmits an impact load that has been imparted from the side of a vehicle body to a seat on which an occupant sits to the floor of the vehicle body.

2. Description of Related Art

A vehicle structure is known that transmits an impact load that has been imparted to the side portion of a vehicle to a floor tunnel at the middle of the vehicle in the vehicle width direction via a seat.

Also, as a load transmission body that transmits a lateral load from the seat to the floor tunnel, there is known a load transmission body that utilizes the console box that is adjacently disposed on the inner side of the seat in the vehicle width direction.

Such a load transmission body is disclosed in Japanese Unexamined Patent Application, First Publication No. S62-210151, Japanese Unexamined Patent Application, First Publication No. 2005-335523, and U.S. Pat. No. 5,897,155.

In the load transmission body that is disclosed in Japanese Unexamined Patent Application, First Publication No. S62-210151, a box-shaped reinforcing member is attached to the inside of the console box, and in the load transmission body that is disclosed in Japanese Unexamined Patent Application, First Publication No. 2005-335523, a reinforcing member that extends in the vehicle width direction is attached to the lower end in the console box.

Also, in the load transmission body that is disclosed in U.S. Pat. No. 5,897,155, the left-side wall and right-side wall of a console box are coupled by beam-shaped reinforcing members that extend in the vehicle width direction.

Also, Japanese Unexamined Patent Application, First Publication No. 2001-105947 discloses a structure in which a reinforcing member is attached to the inner side portion of the floor tunnel that supports the console box.

However, in the load transmission body that disposes the box-shaped reinforcing member on the inner side of the console box (Japanese Unexamined Patent, First Application Publication No. S62-210151), in order to ensure sufficient rigidity, it is unavoidable to increase the wall thickness of the reinforcing member. There is a problem in that it easily becomes a cause of an increase in production cost or weight.

Moreover, in the load structure that attaches a reinforcing member that extends in the vehicle width direction at the lower end of the inner side of the console box (Japanese Unexamined Patent Application, First Publication No. 2005-335523), there is a problem in that it is difficult to exhibit a sufficient effect in vehicles in which the load input portion from the seat is set at a high position.

Moreover, in the load structure in which the left-side wall and right-side wall of a console box are coupled by beam-shaped reinforcing members that extend in the vehicle width direction (U.S. Pat. No. 5,897,155), there is are problems in that the load input position from the seat and the installation position of the reinforcing members are shifted each other depending on the adjustment position in the front-back direction of the seat, and it is difficult to sufficiently receive the input load from the seat.

SUMMARY OF THE INVENTION

Therefore, the invention was conceived in view of the above-described circumstances and provides a load transmission body for a vehicle, the load transmission body being capable of efficiently transmitting an input load from a seat to the floor of the vehicle body while suppressing an increase in thickness of the constituent members.

In order to solve the above problems, the invention provides a load transmission body for a vehicle, the load transmission being adjacently disposed on an inner side of a seat in a vehicle width direction, and transmits an impact load that has been imparted from a side of a vehicle body to the seat to a floor of the vehicle body. The load transmission body of the invention includes: a pair of side walls fixed to the floor of the vehicle body and extending in a vehicle front-back direction; a front reinforcing wall having a closed cross-sectional structure, extending in the vehicle width direction, and reciprocally coupling with the pair of side walls; a rear reinforcing wall disposed at a vehicle rear side of the front reinforcing wall, having a closed cross-sectional structure, extending in the vehicle width direction, and reciprocally coupling with the pair of side walls; and a side reinforcing member disposed at each of the front reinforcing wall and the rear reinforcing wall, extending in the vehicle front-back direction, and coupling the front reinforcing wall with the rear reinforcing wall.

It is preferable that, in the load transmission body of the invention, the side reinforcing member has reinforcing beads that extend in the vehicle body front-back direction.

It is preferable that, in the load transmission body of the invention, the pair of side walls be fixed on side walls of a floor tunnel.

It is preferable that, in the load transmission body of the invention, the pair of side walls have a low portion on a vehicle front portion side and a high portion on a vehicle rear portion side, and be substantially L-shaped in side view.

It is preferable that the load transmission body of the invention further include a bottom plate provided at a lower side of the front reinforcing wall and the rear reinforcing wall, vertically dividing in two regions of the side walls.

It is preferable that, in the load transmission body of the invention, the bottom plate have an upper wall, and the front reinforcing wall be formed in a substantial U-shape in cross section that opens downward, be joined to the upper wall of the bottom plate, and form a closed cross section that extends in the vehicle width direction.

It is preferable that, in the load transmission body of the invention, the bottom plate have an upper wall, and the rear reinforcing wall be formed in a substantial U-shape in cross section that opens downward, be joined to the upper wall of the bottom plate, and form a closed cross section that extends in the vehicle width direction.

It is preferable that the load transmission body of the invention further include a space portion formed between the front reinforcing wall, the rear reinforcing wall, an upper wall of the bottom plate, and the side walls.

It is preferable that the load transmission body of the invention further include box cross members provided under the bottom plate, extending in the vehicle width direction to reciprocally couple the side walls.

It is preferable that, in the load transmission body of the invention, the box cross members be separately disposed in the vehicle front-back direction.

It is preferable that, in the load transmission body of the invention, and the box cross members be fixed to a lower surface of the bottom plate and an upper surface of the floor of the vehicle body.

It is preferable that, in the load transmission body of the invention, the box cross members be provided at locations different from that of the front reinforcing wall and the rear reinforcing wall in the vehicle front-back direction.

It is preferable that the load transmission body of the invention further include a load transmission block provided at an inner side of the seat in the vehicle width direction so as to face both the side wall of the upper side of the bottom plate and the side wall of the lower side of the bottom plate.

In this structure, when an impact load is imparted from a seat to one side wall, that load is transmitted to a front reinforcing wall and a rear reinforcing wall of a closed cross sectional structure via a side reinforcing member that is disposed in the side wall and extends in the front-back direction of the vehicle body.

According to the invention, since it is possible to transmit an impact load that has been imparted from the seat to the side wall to the front reinforcing wall and the rear reinforcing wall via the side reinforcing member that reinforces the side wall, it is possible to efficiently transmit an input load from a seat to the floor of the vehicle body without causing an increase in thickness of the constituent members.

DETAILED DESCRIPTION OF THE INVENTION

Hereinafter, an embodiment in accordance with the invention will be described with reference to the appended drawings.

Figure 1:
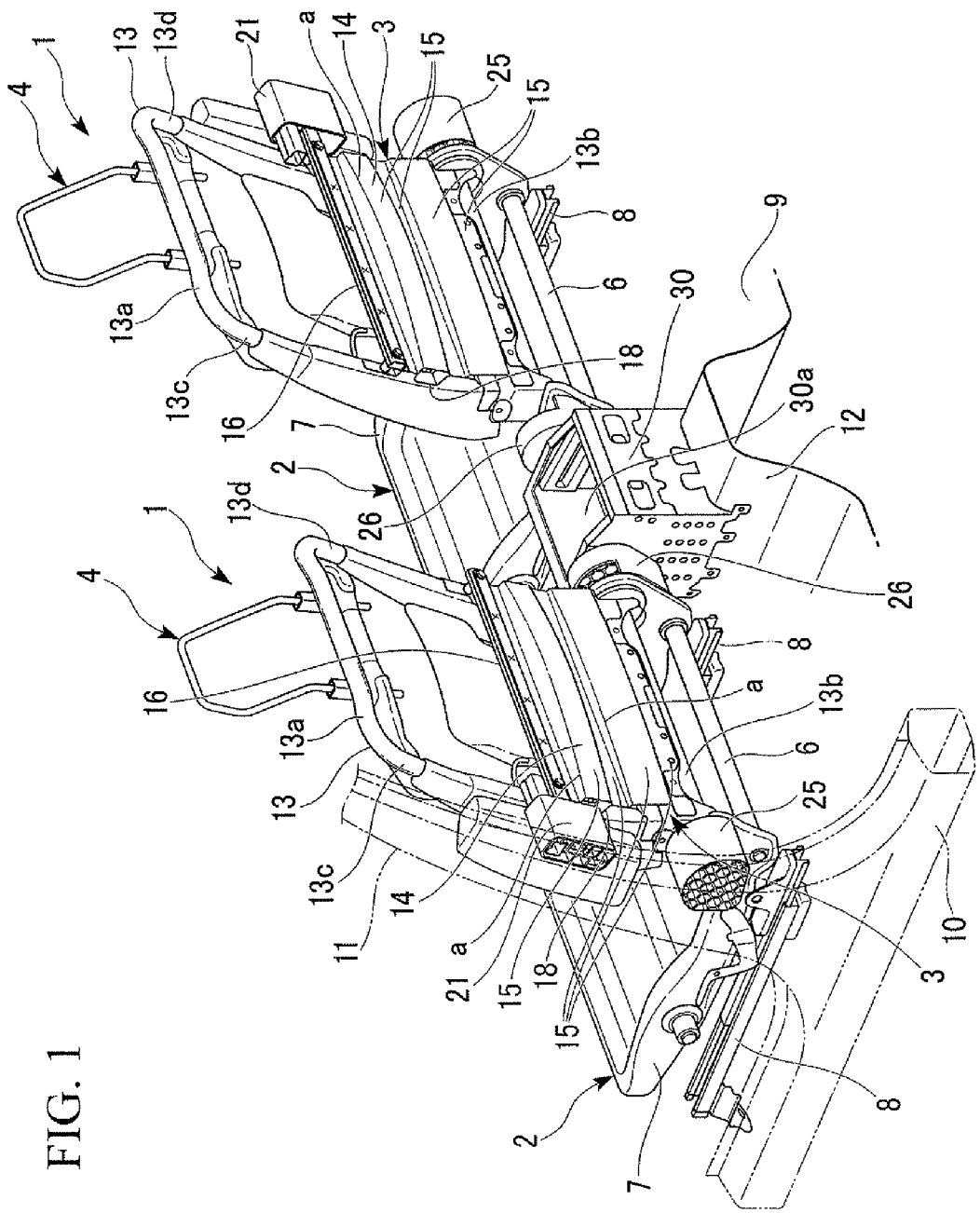
FIG. 1 is a perspective view showing a cabin interior of a vehicle as seen from a rear side of a vehicle seat on a front seat side, and showing an exemplary embodiment of the invention.
Figure 2:
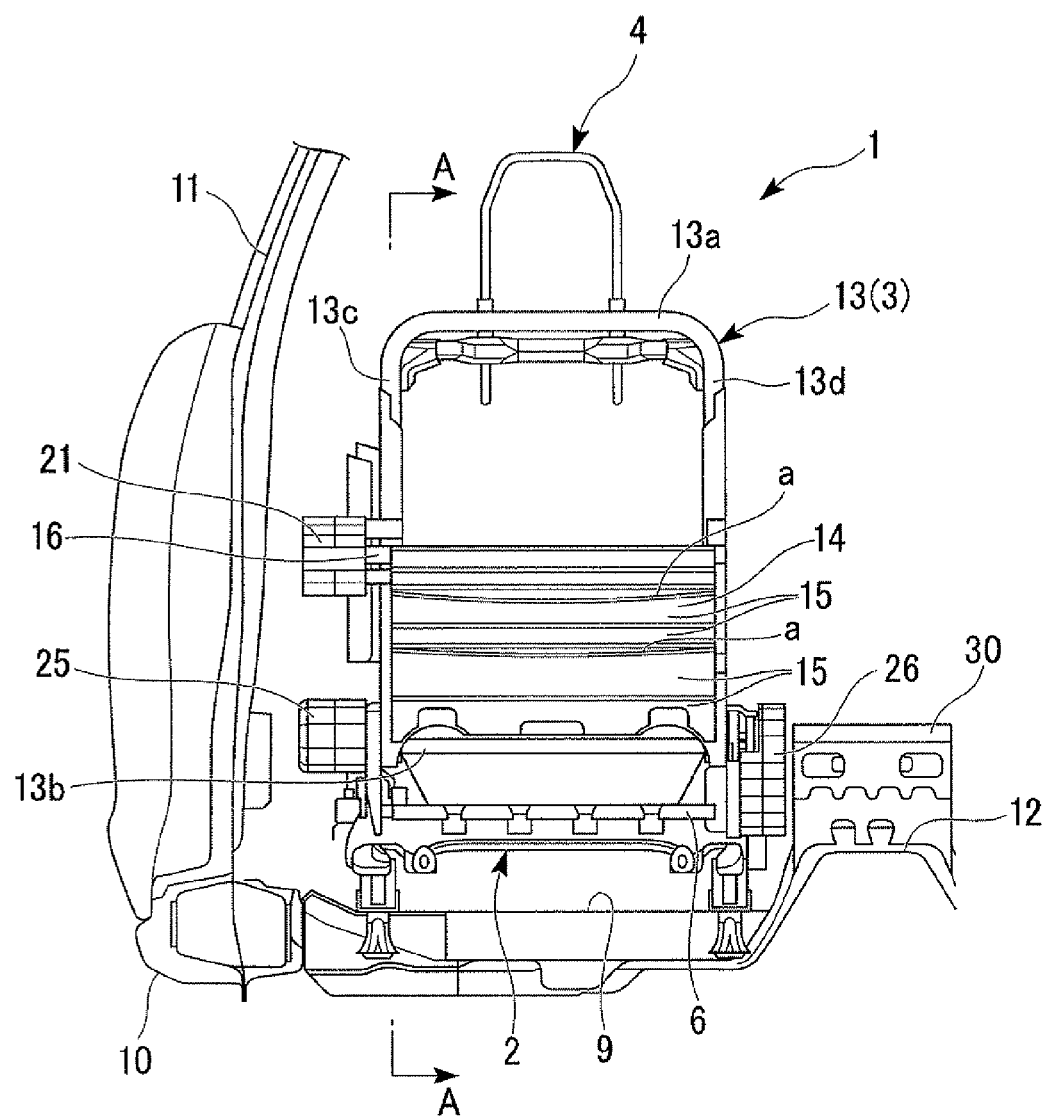
FIG. 2 is a rear view showing the vehicle seat of the embodiment of the invention.

FIG. 1 is a perspective view of the cabin interior of a vehicle as seen from the rear side of a vehicle seat 1 on the front seat side, and FIG. 2 is a rear view of the vehicle seat 1.

In FIGS. 1 and 2, only the frame members of the vehicle seat 1 are shown.

The vehicle seat 1 includes a seat cushion 2, a seat back 3, and a headrest 4. The seat cushion 2 supports an occupant's buttocks. The seat back 3 is connected with the rear end portion of the seat cushion 2, and supports the lumbar and chest (back) of an occupant. The headrest 4 is supported by the upper portion of the seat back 3, and supports the head and neck of an occupant.

The seat cushion 2 includes a cushion frame 7 to which a rear cross member 6 that extends along the vehicle width direction is attached at the rear end portion. The cushion frame 7 is attached to a vehicle body floor 9 via seat rails 8 and 8 in a manner capable of sliding in the front-back direction.

In addition, in FIGS. 1 and 2, reference numeral 10 denotes a side sill that is provided at the lower end side portion of the vehicle body, reference numeral 11 denotes a center pillar that is installed substantially in the center of the vehicle body side portion, and reference numeral 12 denotes a floor tunnel that is formed bulging upward in the middle region of the vehicle body floor 9 in the vehicle width direction.

On the floor tunnel 12 between the left vehicle seat 1 and the right vehicle seat 1 that are front seats, a console box 30 that has a storage portion 30a on the upper surface side is fixed and installed.

In this embodiment, this console box 30 constitutes a load transmission body in accordance with the invention.

The seatback 3 is provided with a seatback frame 13 having a substantial rectangular frame shape that includes an upper frame 13a, a left side frame 13c, a right side frame 13d, and a lower coupling plate 13b.

The lower end of the seatback frame 13 is coupled by a hinge in a manner capable of reclining to the rear end portion of the cushion frame 7.

A support frame of the headrest 4 is attached to be capable of being raised and lowered at the center position in the width direction of the upper frame 13a of the seatback frame 13.

The headrest 4 of the embodiment is an active headrest for preventing whiplash of the occupant during a rear-end collision.

A plate member 14 having a substantial rectangular shape when viewed from the front is attached to the back side of the seatback frame 13.

The plate member 14 has a plurality of uneven portions 15 in which a ridgeline portion a extends in the vehicle width direction, and so a waveform cross-section that is formed by these uneven portions 15 is consecutive in the vehicle body vertical direction.

A cross member 16 that extends in the vehicle body width direction is fixed at the upper edge portion of the plate member 14, and the frame member 14 is supported by the left and right side frames 13c and 13d via this cross member 16.

The cross member 16 is installed at substantial chest height of an occupant seated in the vehicle seat.

A bracket 18 that is formed by uneven portions that are continuous in the vehicle body vertical direction is fixed by welding to the rear surface (the surface faces backward of vehicle body) of the side frames 13c and 13d, and the side edge portions of the plate member 14 are fixed by welding to each top portion of the uneven portions of this bracket 18.

Also, the lower edge portion of the plate member 14 is fixed by welding to the lower coupling plate 13b.

The cross member 16 projects further to the outer side in the vehicle width direction than the side frame 13c, and a load transmission block 21 for transmitting an impact load from the vehicle body side portion to the seat back 3 is attached to this projection portion.

This load transmission block 21 has a honeycomb structure by which a plurality of cylindrical cross sections that extend in the vehicle width direction are arranged in parallel, and the whole is formed with resin in a rectangular parallelepiped shape that is long in the vertical direction.

The load transmission block 21 is supported and fixed by the cross member 16 and the side frame 13c.

Also, the lower edge portions of the left side frame 13c and the right side frame 13d are coupled by a lower cross member (not illustrated). The lower cross member surrounds a hinge shaft that couples the seat cushion 2 and the seat back 3 in a rotatable manner.

A load transmission block 25 is attached to the side surface of the outer side in the vehicle width direction of the side frames 13c and 13d that are positioned on the extension of the lower cross member, and a load transmission block 26 is attached to the side surface of the inner side in the vehicle width direction of the side frames 13c and 13d.

These load transmission blocks 25 and 26, similarly to the load transmission block 21 on the upper side, have a honeycomb structure by which a plurality of cylindrical cross sections that extend in the vehicle width direction are arranged in parallel.

Moreover, the load transmission block 26 near the side frame 13d faces the side of the console box 30 in the center of the vehicle width direction.

The load transmission block 25 that is provided on the outer side in the vehicle width direction directly receives an impact load from the lower side of the vehicle body, and transmits that load to the side frame 13d via the lower cross member.

Also, when the cushion frame 7 has moved to the inner side in the vehicle width direction upon receiving an impact load from the vehicle body side portion, the load transmission block 26 that is provided on the inner side in the vehicle width direction touches the console box 30 and transmits that load to the floor tunnel 12 via the console box 30.

Figure 3:
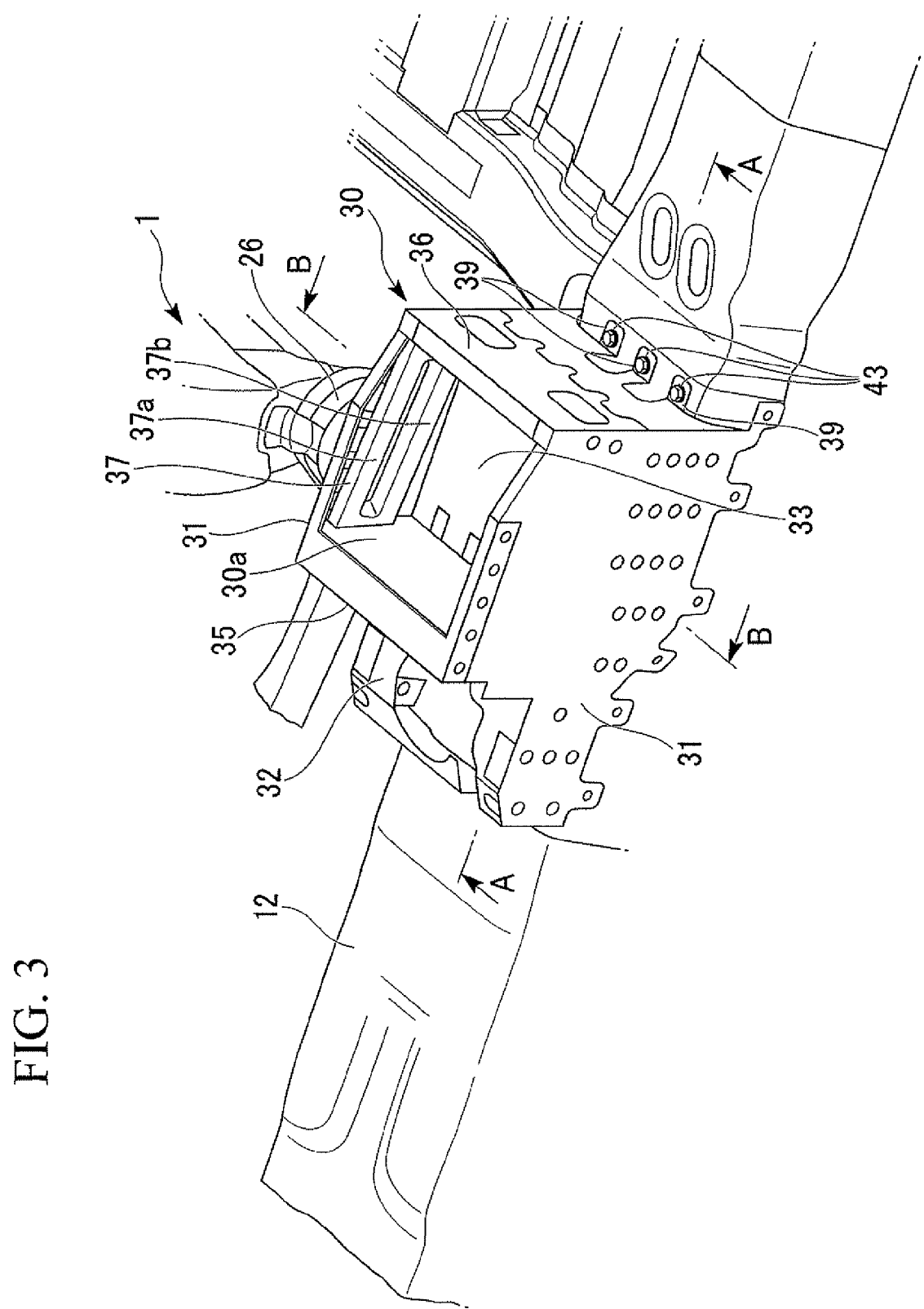
FIG. 3 is a perspective view showing a console box in the vehicle cabin of the embodiment of the invention.
Figure 4:
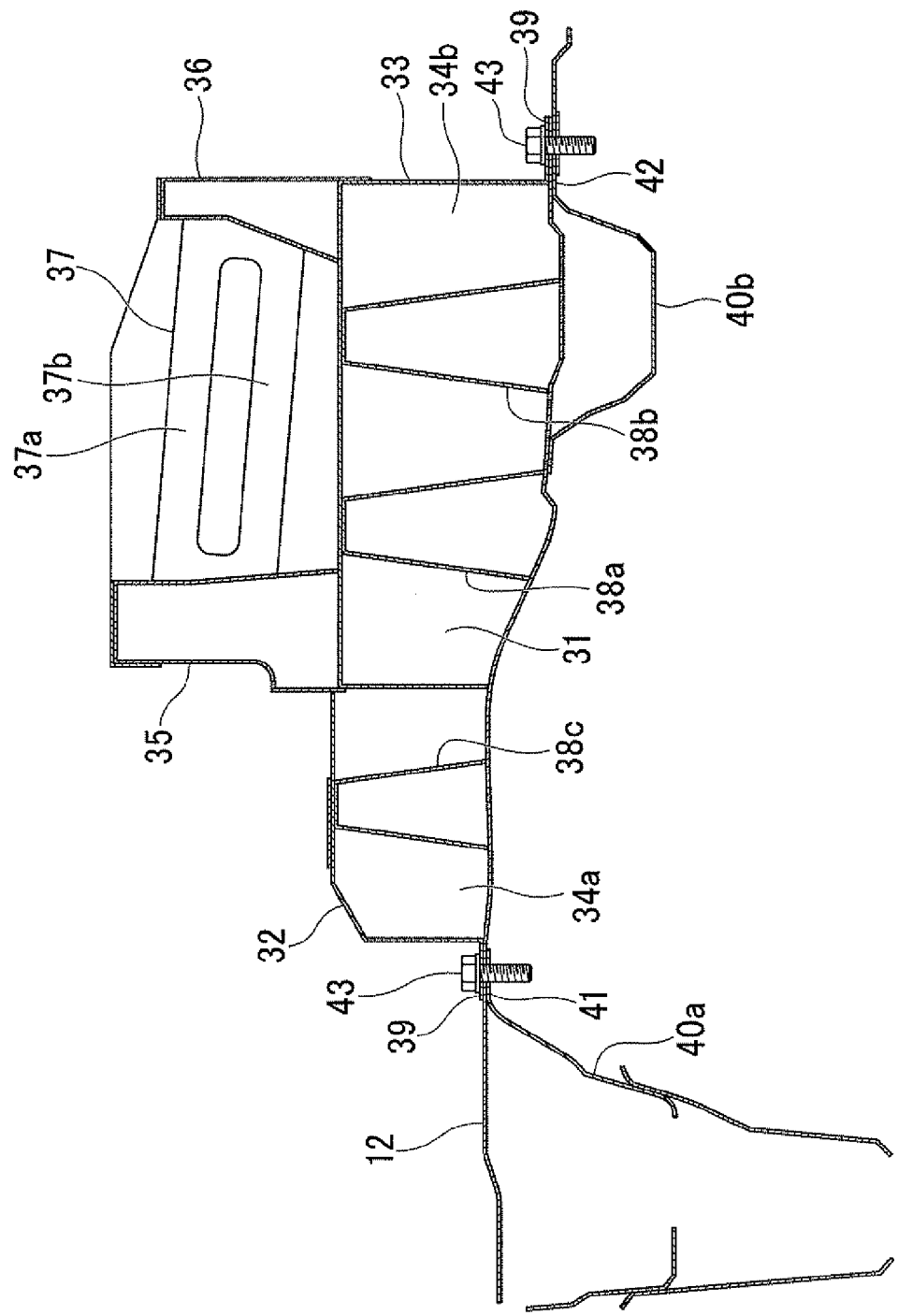
FIG. 4 is a cross-sectional view showing the console box taken along the line A-A shown in FIG. 3 of the embodiment of the invention.
Figure 5:
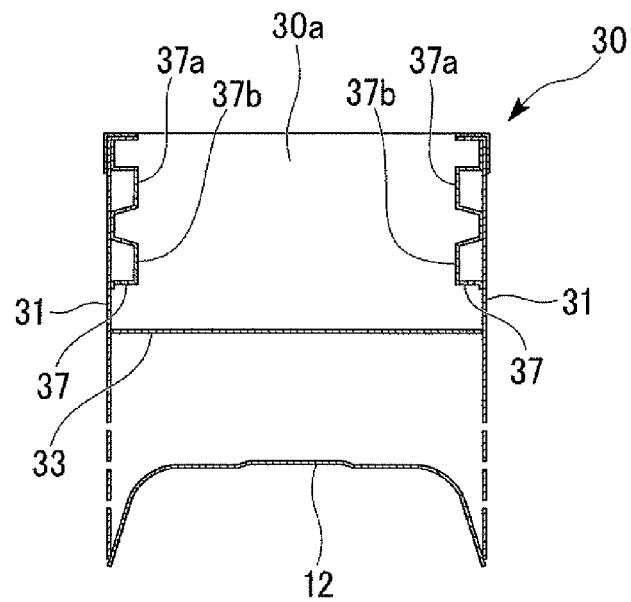
FIG. 5 is a cross-sectional view showing the console box taken along the line B-B shown in FIG. 3 of the embodiment of the invention.

FIGS. 3 to 5 are drawings that show the console box 30 that is provided on the floor tunnel 12, with FIG. 3 being a perspective view, and FIGS. 4 and 5 being cross-sectional views.

In the console box 30, a pair of side wall plates 31 and 31 (side walls) that extend in the front-back direction of the vehicle body along the side walls of the floor tunnel 12 are joined with a plurality of members that extend along the vehicle width direction, and a plurality of spaces are formed between the side wall plates 31 and 31 and these members. The side wall plates 31 and 31 correspond to left-side and right-side of the console box 30 in the vehicle width direction (left-side wall plate and right-side wall plate).

This pair of wide wall plates 31 and 31 is fixed to the side walls of the floor tunnel 12.

Each side wall plate 31 has a low portion on the vehicle front portion side and a high portion on the vehicle rear portion side. The height of the low portion is small, while the height of the high portion is large. Accordingly, the side wall plate 31, when viewed from the side, is formed in a substantial L-shape.

The low portions of the side wall plates 31 and 31 of both sides are coupled by a front plate 32 with a substantial L-shape in cross-section that forms a front wall and an upper wall.

The lower half positions of the high portions of the side wall plates 31 and 31 of both sides are coupled by a bottom plate 33 that is formed in a substantial U-shape in cross section.

The bottom plate 33 vertically divides in two regions that correspond to the high portions of the side wall plates 31 and 31.

The bottom plate 33 and the front plate 32 form a pair of support box portions 34a and 34b having a box shape in the lower region of the console box 30.

Also, the upper half portions of the high portion of both side wall plates 31 and 31 are reciprocally coupled by a front reinforcing wall 35 and a rear reinforcing wall 36 that are separately disposed in the front-back direction of the vehicle body.

The front reinforcing wall 35 and the rear reinforcing wall 36 are both formed in a substantial U-shape in cross section that opens downward, are joined to the upper wall of the bottom plate 33, and form a closed cross section that extends in the vehicle width direction.

The front reinforcing wall 35, the rear reinforcing wall 36, and the upper wall of the bottom plate 33 form a space portion in which the upper part is opened between both side wall plates 31 and 31.

This space portion forms a storage portion 3a of the console box 30 for storing articles in the interior.

Moreover, a side reinforcing member 37 that has reinforcing beads 37a and 37b that extend in the vehicle body front-back direction is joined to the inner surface of the storage portion 30a of the side wall plates 31 and 31 of both sides.

The front end portion and the rear end portion of each side reinforcing member 37 is coupled to the front reinforcing wall 35 and the rear reinforcing wall 36, respectively.

Box cross members 38a and 38b that have a substantial U-shape in cross section and that extend in the vehicle width direction to reciprocally couple the side wall plates 31 and 31 are provided in the support box 34b that is at the bottom of the storage portion 30a of the console box 30.

The box cross members 38a and 38b are separately disposed in the vehicle front-back direction. The box cross members 38a and 38b are provided at locations different from that of the front reinforcing wall 35 and the rear reinforcing wall 36 in the vehicle front-back direction.

The upper wall of the box cross members 38a and 38b is joined to the upper wall of the bottom plate 33 that is exposed to the storage portion 30a.

Also, in the support box 34a at the front side, a box cross member 38c that has a substantial U-shape in cross section and that extends in the vehicle width direction to reciprocally couple the side wall plates 31 and 31 is provided, similarly to the box cross members 38a and 38b.

The box cross members 38a and 38b are fixed to the lower surface of the upper wall of the bottom plate 33 and the upper surface of the floor tunnel 12, and the box cross member 38c is fixed to the lower surface of the upper wall of the front plate 32 and the upper surface of the floor tunnel 12.

Moreover, at the front lower end of the front plate 32 and the rear lower end of the bottom plate 33, joining flanges 39 having a substantial L-shape are provided, and each joining flange 39 is overlapped the upper surface of the floor tunnel 12.

Figure 6:
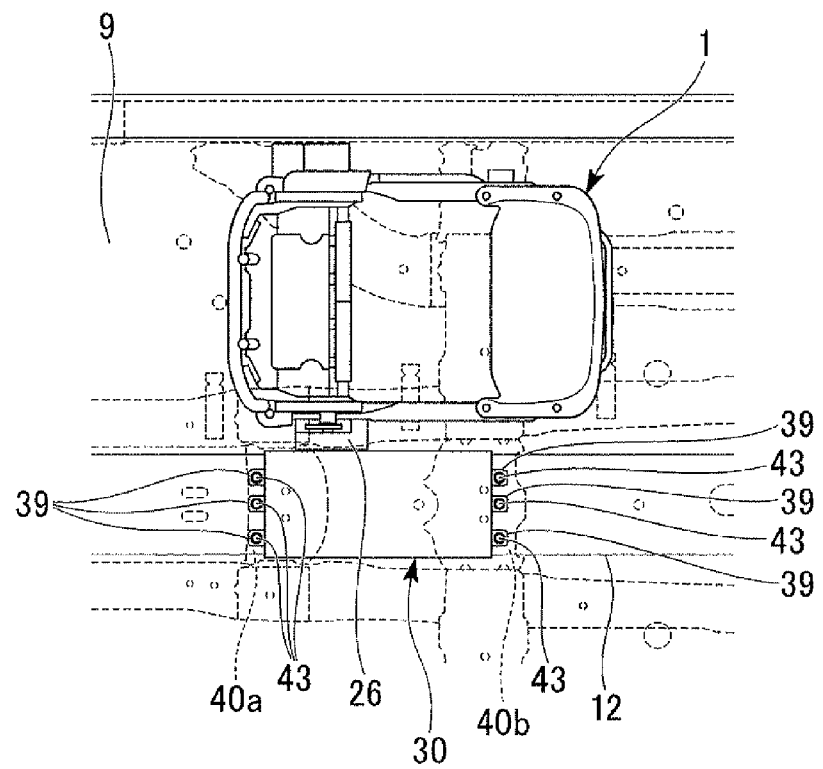
FIG. 6 is a top view of the vehicle cabin of the embodiment of the invention.

FIG. 6 is a plan view from a top of the floor tunnel 12 in the vehicle cabin.

As shown in this FIG. 6 and the cross-sectional view of FIG. 4, a pair of cross members 40a and 40b that extend in the vehicle width direction are joined at positions adjacent to the seat 1 in the floor tunnel 12.

The joining flanges are provided at the upper portion of the cross members 40a and 40b.

Each joining flange is joined the lower surface of the upper wall of the floor tunnel 12.

The joining flange 39 of the front plate 32 is disposed above a joining flange 41 on the rear side of the front-side cross member 40a, sandwiching the floor tunnel 12.

The joining flange 39 of the bottom plate 33 is disposed above a joining flange 42 on the front side of the rear-side cross member 40b, sandwiching the floor tunnel 12.

The joining flange 39 of the front plate 32 is fastened and fixed by a bolt 43 to the joining flange 41 of the front-side cross member 40a together with the floor tunnel 12.

In the same way, the joining flange 39 of the bottom plate 33 is fastened and fixed by a bolt 43 to the joining flange 42 of the rear-side cross member 40b together with the floor tunnel 12.

Figure 7:
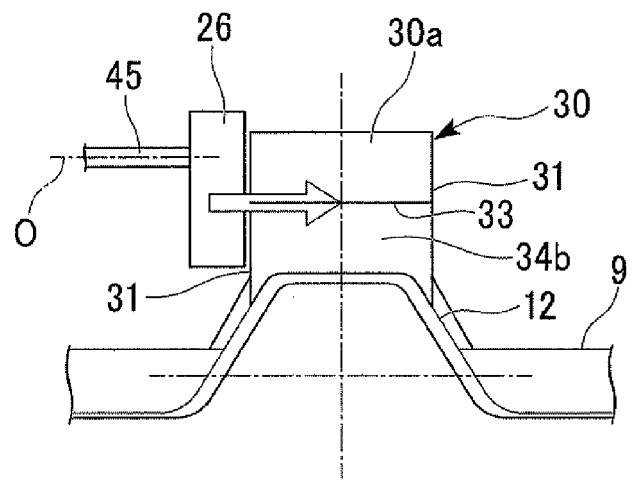
FIG. 7 is a schematic cross-sectional view showing the console box taken along the line B-B shown in FIG. 3 of the embodiment of the invention.

FIG. 7 schematically shows the positional relationship of the load transmission block 26 on the inner side of the vehicle seat 1, and the console box 30 and the floor tunnel 12.

As shown in FIG. 7, the load transmission block 26 is not disposed so as to be vertically symmetrical with respect to the shaft center O of a lower cross member 45 of the vehicle seat 1, but rather disposed so as to be shifted to the lower side with respect to the shaft center O. In other words, the center of the load transmission block 26 and the shaft center O are shifted in the vehicle vertical direction.

Accordingly, in the case of an impact load being transmitted along the shaft center O of the lower cross member 45, the load is transmitted from the load transmission block 26 to the console box 30 at a position that is lower than the shaft center O of the lower cross member 45.

Moreover, the load transmission block 26 is provided facing both the storage portion 30a and the support box portion 34b.

The impact load that is transmitted from the vehicle seat 1 is transmitted to the entire surface of the side wall plate 31 of the console box 30 via the load transmission block 26.

Figure 8:
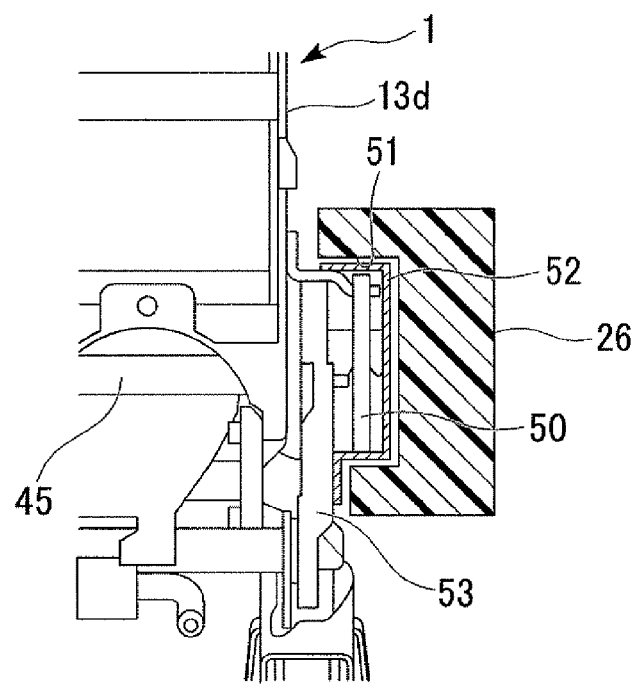
FIG. 8 is a cross-sectional rear view partially showing the vehicle seat of the embodiment of the invention.

FIG. 8 partially shows a rear view of the vehicle seat 1 with a vertical cross section of the load transmission block 26.

As shown in FIG. 8, the load transmission block 26 on the inner side in the vehicle width direction is installed so as to cover a spiral spring 50 for reclining of the lower end of the side frame 13d.

In order to avoid interference with the spiral spring 50, a recess portion 51 is formed on the inner side of the load transmission block 26.

On the inner side of this recess portion 51, a cover member 52 having a bottomed cylindrical shape that covers the circumference and the front surface of the spiral spring 50 is attached.

This cover member 52 prevents the spiral spring 50 or the protruding portion of the circumference thereof from coming in direct contact with the load transmission block 26 during the input of an impact load.

Figure 9:
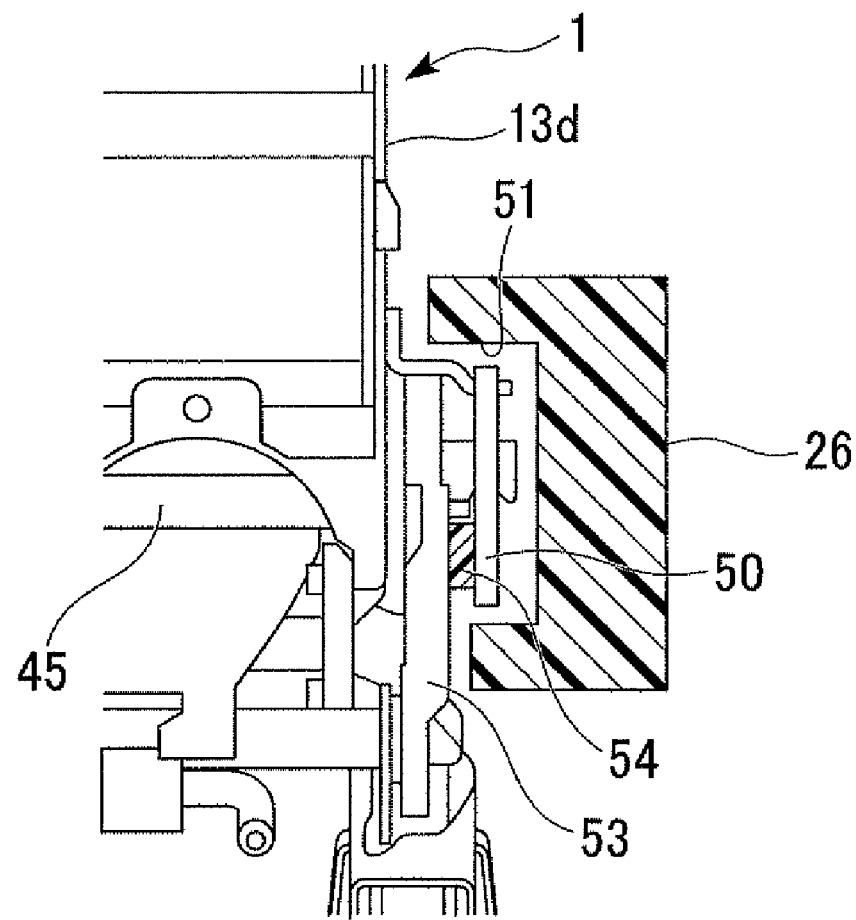
FIG. 9 is a cross-sectional rear view partially showing the vehicle seat of a modified example of the embodiment of the invention.

As shown in FIG. 9, a separate load transmission member 54 may be interposed between the spiral spring 50 and a seat side member 53 so as to be able to reliably transmit a load from the seat side through the spiral spring 50 to the load transmission block 26 during the input of an impact load.

In the above constitution, when the vehicle body side wall such as the center pillar 11 deforms in the direction from the center pillar 11 to the seat back 3 as a result of an impact load being imparted from the side portion of the vehicle, the load from that side wall is transmitted to the side frame 13c via at least any one of the upper and lower load transmission blocks 21 and 25.

In the case of the impact load being imparted to the lower load transmission block 25, along with movement of the entire seat in the direction of the inner side in the vehicle width direction, the load transmission block 26 on the lower inner side in the vehicle width direction touches the console box 30.

At this time, the load is transmitted from the lower cross member below the seatback frame 13 to the floor tunnel 12 via the load transmission block 26 and the console box 30.

Also, in the case of the impact load being imparted to the upper load transmission block 21, that load is imparted to the plate member 14 via the cross member 16 simultaneously with being transmitted to the side frame 13c.

The impact load that is imparted along the shaft direction to the cross member 16 is imparted from the cross member 16 to the upper end portion of the plate member 14, and causes the generation of stress in the shearing direction in a plurality of regions divided by the ridgeline portion a of the uneven portions 15 of the plate member 14.

Therefore, the impact load that has been imparted is received and stopped over nearly the entire region of the plate member 14.

In this way, when the impact load is distributed and transmitted over nearly the entire region of the side plate 13c and the plate member 14, the entire seat moves in the direction of the inner side in the vehicle width direction, the load transmission block 26 touches the console box 30, and the load is transmitted to the floor tunnel 12 via the console box 30.

During the input of an impact load, when the load is transmitted from the load transmission block 26 to the console box 30, the end surface of the load transmission block 26 initially touches the side plate 31 of the console box 30.

At this time, the load is transmitted to the front reinforcing wall 35 and the rear reinforcing wall 36 via the side reinforcing member 37 having high rigidity in the bending direction.

The load that is transmitted to the front reinforcing wall 35 and the rear reinforcing wall 36 is transmitted to the joining portions with the floor tunnel 12 via the front and rear support box portions 34a and 34b that are reinforced by the box cross members 38a, 38b, and 38c.

With regard to the front end portion and the rear end portion of the console box 30 in the joining portions between the console box 30 and the floor tunnel 12, since the front end portion and the rear end portion of the console box 30 are directly fastened and fixed to the cross members 40a and 40b in the floor tunnel 12 via the joining flanges 39, the transmitted load is efficiently received and stopped by the region with high rigidity in the floor tunnel 12.

As described above, the console box 30 that is used in a vehicle according to the embodiment can transmit an impact load that is imparted from the load transmission block 26 of the seat 1 to the front reinforcing wall 35 and the rear reinforcing wall 36 having a closed cross-sectional structure via the side reinforcing member 37 that reinforces so as to increase the flexural rigidity of the side wall plate 31.

For this reason, the input load can be efficiently transmitted to the floor tunnel 12 without causing an increase in thickness of the members around the storage portion 30a.

Accordingly, in accordance with this console 30, it is possible to achieve rapid transmission of an impact load to the floor tunnel 12 at the middle in the vehicle width direction without causing an increase in weight of the vehicle or a reduction in space of the storage portion 30a.

In particular, in the case of this embodiment, since the support box portions 34a and 34b that are reinforced by the plurality of box cross members 38a, 38b, and 38c are provided on the lower side of the front reinforcing wall 35 and the rear reinforcing wall 36 of the console box 30, and the load transmission block 26 is provided facing the storage portion 30a and the support box portion 34b (or 34a), it is possible to more efficiently transmit an input load to the floor tunnel 12.

In this console box 30, the side wall plates 31 is reinforced by the side reinforcing members 37 that extends in the vehicle body front-back direction, and are joined to the front reinforcing wall 35 and the rear reinforcing wall 36 as described above.

For this reason, the flexural rigidity is maintained at a high level in the entire region in the vehicle body front-back direction.

Accordingly, even if the slide position of the seat 1 in the front-back direction is changed, it is possible to always efficiently transmit a load from the side wall plate 31 to the front reinforcing wall 35 and the rear reinforcing wall 36.

Moreover, since the center of the load transmission block 26 on the side of the seat 1 is shifted downward from the shaft center O of the lower cross member 45 in the case of this embodiment, it is possible to lower the load input position on the side of the console box 30 during the input of an impact load as shown in FIG. 7.

Accordingly, since the moment that acts about the floor tunnel 12 via the console box 30 becomes small, it is possible to advantageously receive the input load with the floor tunnel 12.

Moreover, in this embodiment, the front end portion and the rear end portion of the console box 30 are directly fastened and fixed to the cross members 40*a* and 40*b* along with the floor tunnel 12. For this reason, a load that is imparted to the console box 30 can be received by the floor tunnel 12 and the cross members 40*a* and 40*b* with high rigidity.

Also, in this embodiment, as shown in FIG. 8, the cover member 52 is arranged in the recess portion 51 on the inner side of the load transmission block 26 that covers the spiral spring 50. For this reason, during the transmission of an impact load from the seat 1 to the load transmission block 26, it is possible to prevent the spiral spring 50 or the protruding portion of the circumference thereof from interfering with the load transmission block 26 and causing damage to the load transmission block 26.

Moreover, as shown in FIG. 9, in the case of adopting a constitution that interposes the load transmission member 54 between the back portion of the spiral spring 50 and the seat side member 53, it is possible to rapidly transmit an impact load that is imparted to the seat to the load transmission block 26 via the spiral spring 50.

While preferred embodiments of the invention have been described and illustrated above, that these are exemplary of the invention and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

What is claimed is:

1. A load transmission body for a vehicle, that is adjacently disposed on an inner side of a seat in vehicle width direction, and transmits an impact load that has been imparted from a side of a vehicle body to the seat to a floor of the vehicle body, the load transmission body comprising:
   a pair of side walls fixed to the floor of the vehicle body and extending in a vehicle front-back direction;
   a front wall, extending in the vehicle width direction, and reciprocally coupling with the pair of side walls;
   a rear wall disposed at a vehicle rear side of the front wall, extending in the vehicle width direction, and coupling with the pair of side walls;
   a side reinforcing member provided at each of the side walls, having reinforcing beads extending in the vehicle front-back direction, and a front end portion and a rear end portion that are coupled to the front wall and the rear wall, respectively, the reinforcing beads being joined to the inner surface of the side walls within a storage portion of the load transmission body;
   a bottom plate attached to the pair of side walls vertically dividing the load transmission body along a tall portions of the side walls, the bottom plate forming a support box portion in a lower region of the load transmission body, and the bottom plate including a first joining flange fastened and fixed by a bolt to a second joining flange of a rear-side cross member together with a floor member; and
   a space portion formed by the front wall, the rear wall, both of the side walls, and an upper surface of the bottom plate, the space portion opening at an upper part thereof and forming the storage portion therein for storing articles in the interior.

2. The load transmission body according to claim 1, further comprising:
   a seat back of the seat formed so that lower edge portions of a left side frame and a right side frame are coupled by a lower cross member; and
   a load transmission block attached to the side surface of the inner side in the vehicle width direction of the right side frame that is positioned on the extension of the lower cross member,
   wherein
   the bottom plate is coupled to the floor tunnel of the vehicle at a bottom of the storage portion, and forms the support box portion between the bottom plate and the floor tunnel, and
   the load transmission block is disposed so as to be shifted to a lower side with respect to a shaft center of the lower cross member and so as to face both of the storage portion and the support box portion.

* * * * *